Aug. 27, 1968  F. S. AJERO  3,398,984
MOTOR VEHICLE WITH LATERALLY ADJUSTABLE CAB
Filed June 2, 1966  5 Sheets-Sheet 1
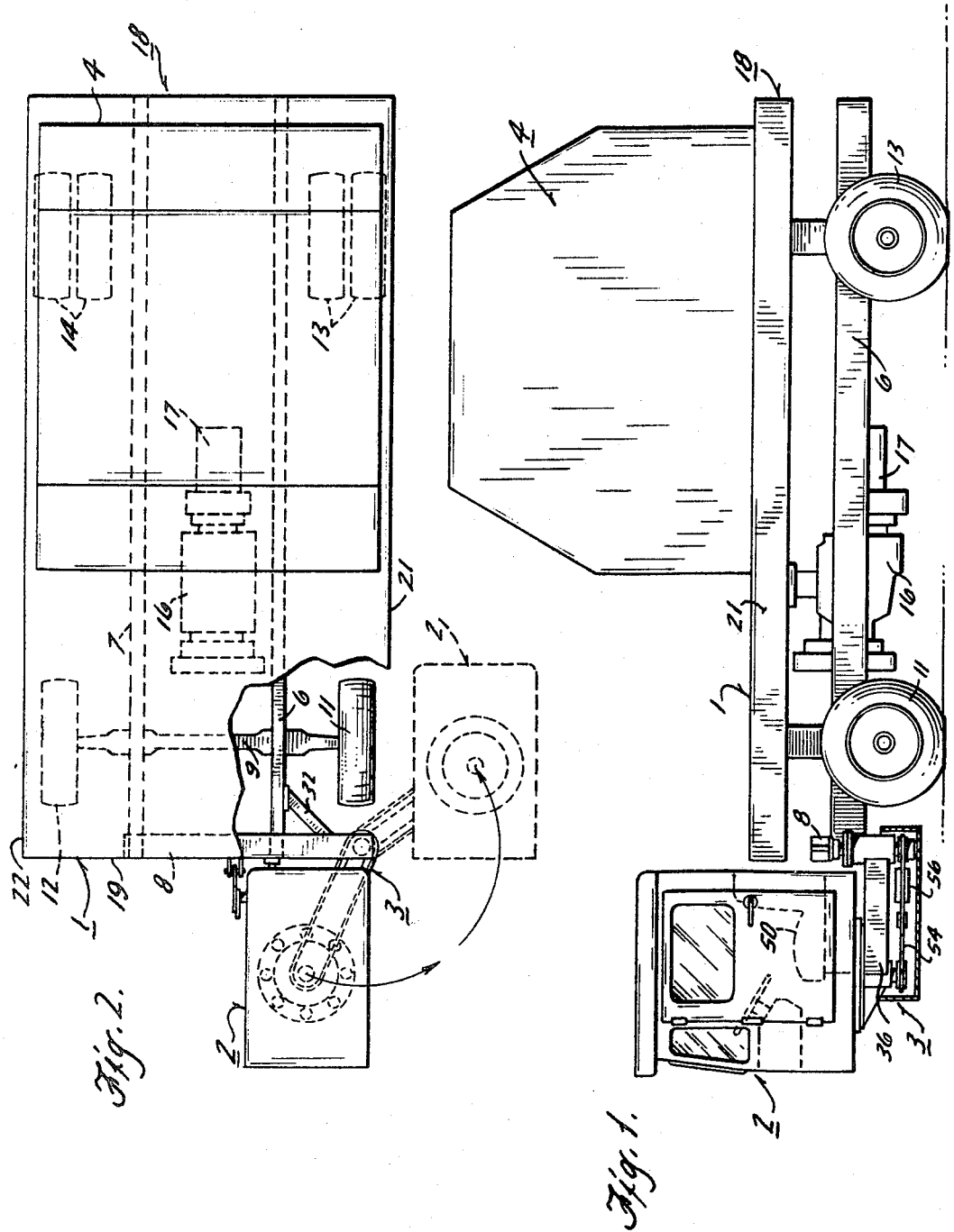
INVENTOR.
FORTUNATO S. AJERO
BY
ATTORNEY.

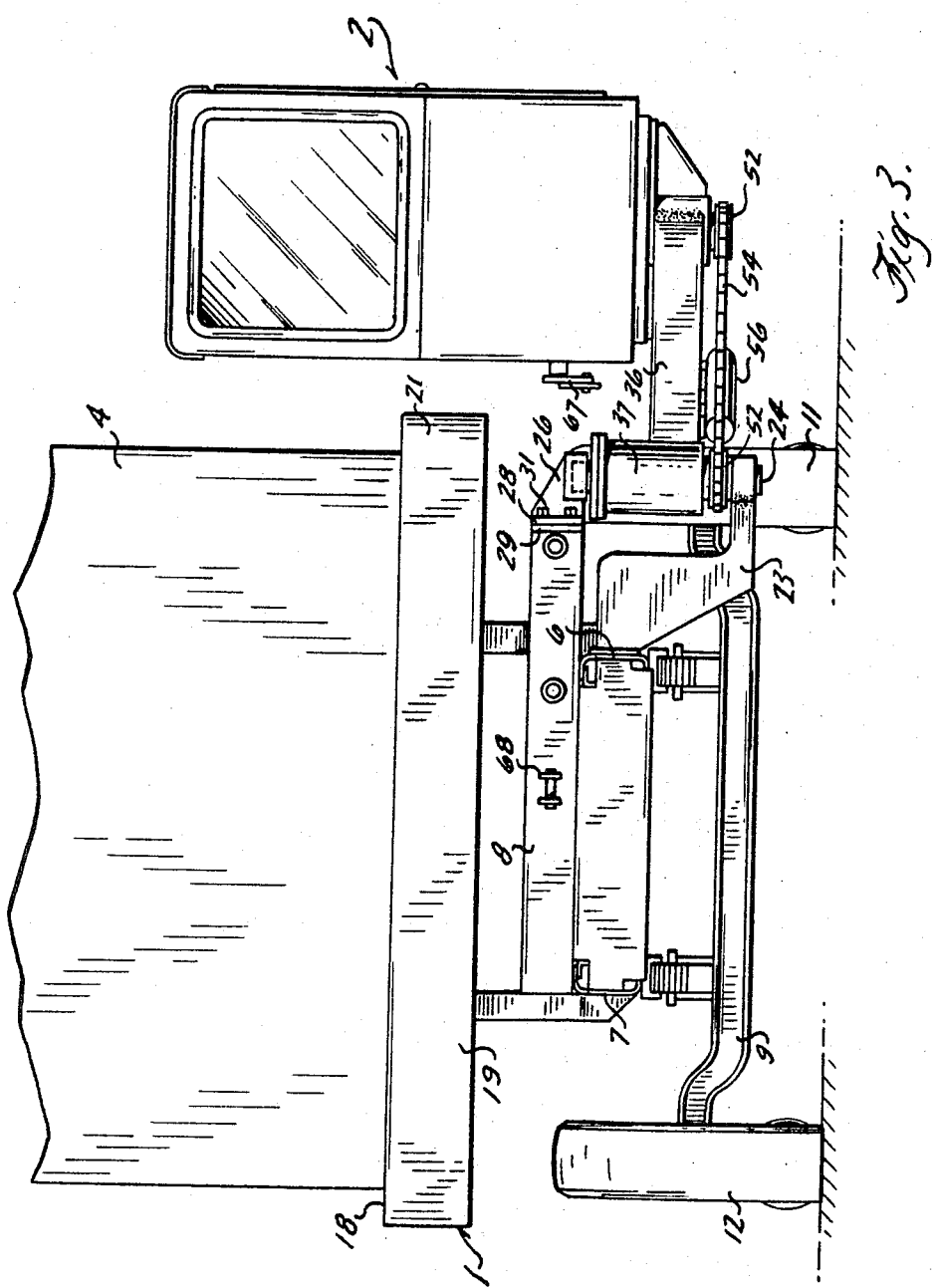

Aug. 27, 1968  F. S. AJERO  3,398,984
MOTOR VEHICLE WITH LATERALLY ADJUSTABLE CAB
Filed June 2, 1966  5 Sheets-Sheet 3

INVENTOR.
FORTUNATO S. AJERO
BY
ATTORNEY.

Aug. 27, 1968          F. S. AJERO                3,398,984
         MOTOR VEHICLE WITH LATERALLY ADJUSTABLE CAB
Filed June 2, 1966                           5 Sheets-Sheet 4
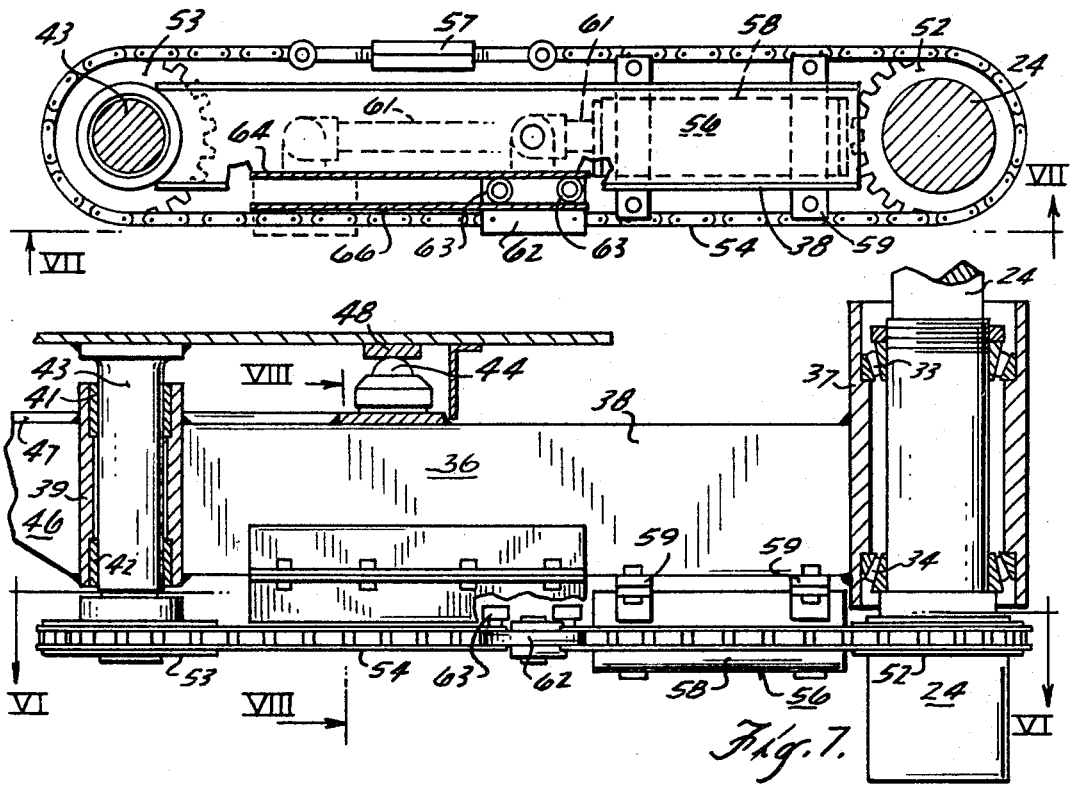
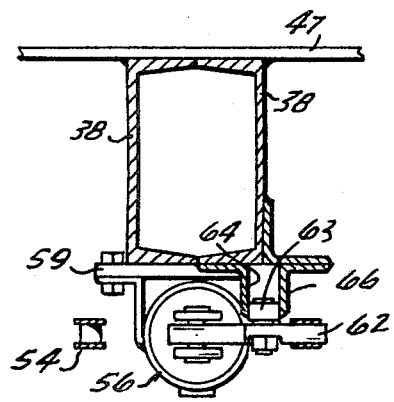
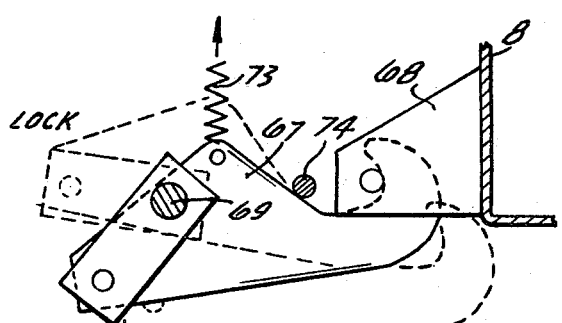
INVENTOR.
FORTUNATO S. AJERO
BY
ATTORNEY.

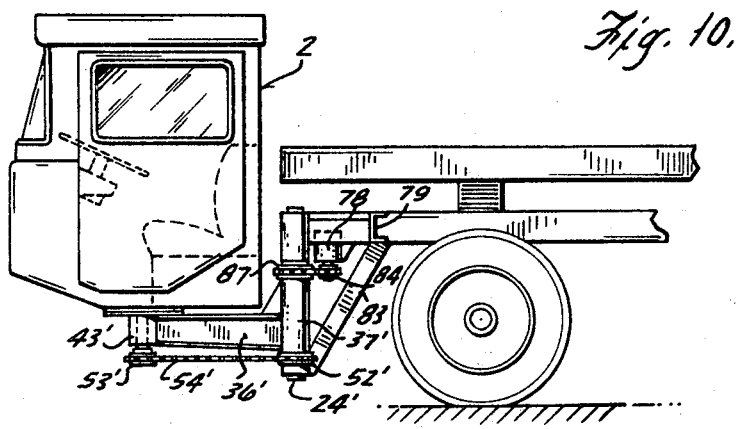
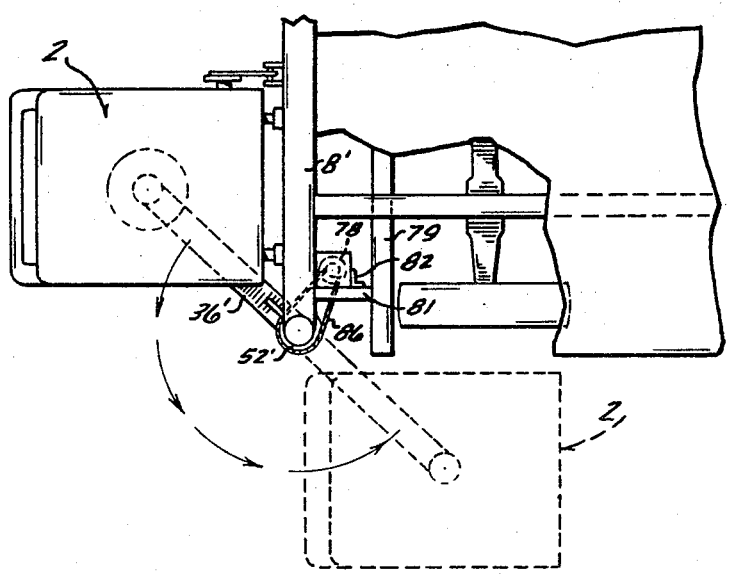
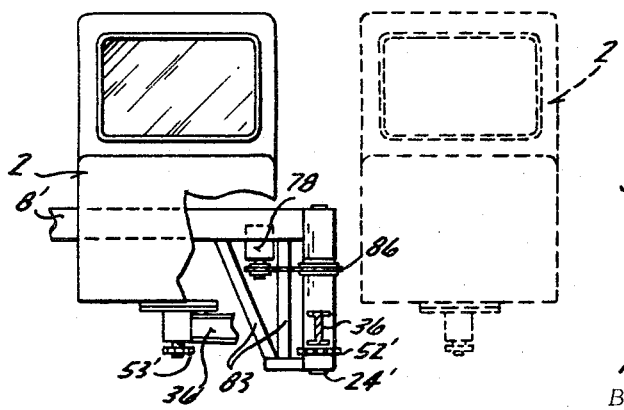

United States Patent Office 3,398,984
Patented Aug. 27, 1968

3,398,984
MOTOR VEHICLE WITH LATERALLY
ADJUSTABLE CAB
Fortunato S. Ajero, Milwaukee, Wis., assignor to Koehring
Company, Milwaukee, Wis., a corporation of Wisconsin
Filed June 2, 1966, Ser. No. 554,728
8 Claims. (Cl. 296—1)

ABSTRACT OF THE DISCLOSURE

A truck chassis carries a flat cargo deck, and the driver's seat and manual vehicle controls are mounted in a cab which is swingable on a horizontal arc about the left front corner of the chassis selectively into a transit position in front of the deck and into a load transfer position at the left side of the deck.

---

The invention relates to motor vehicles and it is concerned more particularly with a cargo truck of large load handling capacity.

Generally, it is an object of the invention to provide an improved cargo truck which can be meneuvered into position for loading or unloading at a warehouse or the like by driving it forwardly up to a loading platform or other elevated floor area. In other words, the invention contemplates a cargo truck which can be nosed up to a wall or edge at the place of cargo transfer, as distinguished from an ordinary truck which is loaded or unloaded over its rear end and which must be backed up in order to aline its rear end with a warehouse loading platform or the like.

More specifically, it is an object of the invention to provide an improved motor vehicle wherein a driver's cab is movably arranged with respect to a cargo deck on the vehicle chassis in such a manner that the cab can be positioned selectively either forwardly of the cargo deck for road travel, or laterally of the cargo deck for transfer of cargo from or upon the deck.

A further object of the invention is to provide an improved motor vehicle of the above mentioned character which is equipped with a power operated mechanism for moving the driver's cab from a forward laterally inward adjusted transit position to a rearward laterally outward adjusted cargo transfer position, and vice versa, and wherein the cab is automatically maintained in facing relation to the direction of vehicle travel while it is moved back and forth between the transit and cargo transfer positions.

A still further object of the invention is to provide a compact, efficient and relatively inexpensive power operated mechanism for effecting translatory movement of the cab between its forward laterally inward and its rearward laterally outward adjusted positions.

A still further object of the invention is to provide a cargo truck of the above mentioned character wherein the forward laterally inward adjusted transit position of the cab is accurately determined and the cab is releasably locked in that position.

These and other objects and advantages are attained by the present invention, various novel features of which will be apparent from the description herein and from the accompanying drawings in which:

FIG. 1 is a side elevation of a cargo truck embodying the invention;

FIG. 2 is a top view of the cargo truck shown in FIG. 1, a driver's cab being shown in full lines in a transit position and in broken lines in a cargo transfer position;

FIG. 3 is a front view of a cargo truck having an adjustable driver's cab as shown in FIGS. 1 and 2, the cab in FIG. 3 being shown adjusted to the cargo transfer position which is indicated by dotted lines in FIG. 2;

FIG. 6 is an enlarged plan view partly in section on line VI—VI of FIG. 7, of a power transmitting mechanism for adjusting the cab to its transit and load transfer positions;

FIG. 7 is an elevational view on line VII—VII of FIG. 6, parts in FIG. 7 being broken away and shown in section;

FIG. 8 is a section on line VIII—VIII of FIG. 7;

FIG. 9 is a section on line IX—IX of FIG. 4 showing a latch mechanism; and

FIGS. 10, 11 and 12 are side, top and front views, respectively, of a cab installation on a vehicle similar to the one shown in FIGS. 1, 2 and 3 but incorporating a modified form of power actuated mechanism for adjusting the cab to its transit and load transfer positions.

Figure 4:
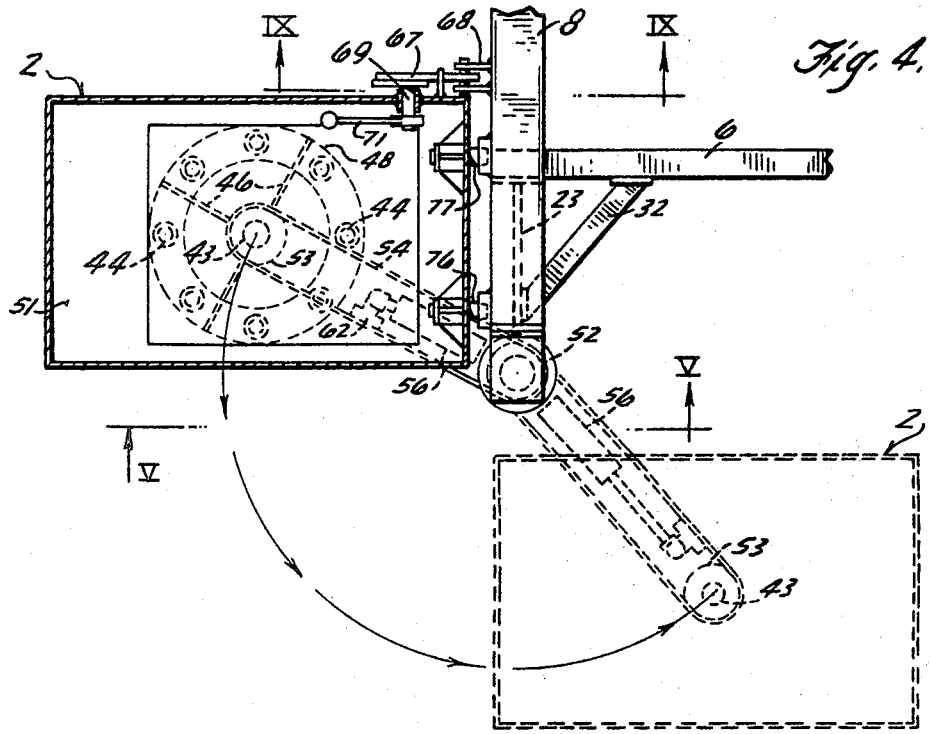
FIG. 4 is an enlarged fragmentary top view of the cab and adjacent vehicle portions shown in FIG. 2, portions of the cab in FIG. 4 being broken away and shown in section.

The motor vehicle shown in FIGS. 1, 2 and 3 comprises a vehicle body, generally designated by the reference character 1, a driver's cab 2, and adjustable connecting means 3 between the vehicle body and driver's cab. As will be explained more fully herein below, the connecting means 3 are selectively operable to present the cab 2 in either the full line position or the dotted line position shown in FIG. 2. When the cab is in the full line position, it occupies a forward, laterally inward position of adjustment relative to the front of the vehicle body 1, and a driver in the cab will be suitably positioned to operate the vehicle in transit, as on a highway. On the other hand, when the cab is in the dotted line position, it occupies a rearward, laterally outward position of adjustment relative to the front end of the vehicle body, and a cargo such as generally indicated by the reference character 4 in FIGS. 1 and 2 may then be transferred upon or from the vehicle body over its front end without interference with the cab.

The vehicle body 1 comprises a chassis including longitudinal side sills 6 and 7, a front cross beam 8, a front axle 9 mounting steerable front wheels 11 and 12, and a rear axle (not shown) mounting dual tire propelling wheels 13 and 14. A power plant including an internal combustion engine 16 and a change speed transmission mechanism 17, is suitably mounted between the side sills 6 and 7; and conventional power transmission mechanism, not shown, connects the transmission 17 in driving relation with the rear wheels 13 and 14.

The vehicle body further comprises a cargo deck 18 which, as best shown in FIG. 1, is mounted on the wheeled chassis in overlying relation to the power plant 16, 17. The cargo deck is of conventional construction and dimensioned to present a rectangular cargo supporting area which extends longitudinally as well as transversely beyond the front and rear wheels 11, 12 and 13, 14. The front edge 19 of the cargo deck also defines the front edge of the vehicle body, and it extends between longitudinal side edges 21 and 22 of the cargo deck, which also define the longitudinal side edges of the vehicle body.

The front cross beam 8 of the chassis frame, as best shown in FIGS. 3 and 4, is extended outwardly beyond the side sill 6. Below the overhanging portion of the front cross beam 8 an angle bracket 23 is rigidly secured to the outer vertical face of the side sill 6 and extends downward therefrom and then laterally outward in a generally horizontal direction. Rigidly secured to the lower outer end of the angle bracket 23, as by welding, is an upright heavy pin 24, and the upper end of the pin 24 is connected to the outer end of the cross beam 8 by a bracket 26. A socket portion 27 of the bracket 26 embraces the upper end of the pin 24, and a vertical flange 28 of the bracket 26 is detachably secured to an adjacent end flange 29 of the cross beam 8 by bolts 31. A diagonal brace 32 (FIG. 4) extends between the angle bracket 23 and the side sill 6.

Rotatably mounted on the pin 24 by means of upper and lower conical roller bearings 33, 34 (FIG. 7) is a support arm 36 for the driver's cab 2. The roller bearings 33, 34 are mounted within a sleeve 37 to which a hollow beam 38 is secured at one end by welding so as to extend radially therefrom. Welded to the other end of the beam 38 is a sleeve 39 which is equipped with upper and lower bearing bushings 41, 42 for a journal 43 depending from the cab 2.

In order to support the cab 2 on the arm 36 for rotation on the axis of the journal 43, a circular series of ball type casters 44 are mounted at the upper side of the support arm 36 around the axis of the journal 43. Radial bracket plates 46 are welded to the sleeve 39 and support a mounting ring 47 for the casters 44, the mounting ring being also secured to the top of the hollow beam 38 as shown in FIG. 8. At the under side of the cab 2 a wear ring 48 bears upon the balls of the casters 44. The wear ring 48 is secured to a turntable 49 which has a central welded connection with the upper end of the journal 43. The turntable is thus rotatably centered on the support arm 36 by the journal 43 and associated bearing sleeves 41, 42, while it is sustained by the casters 44.

Figure 5:
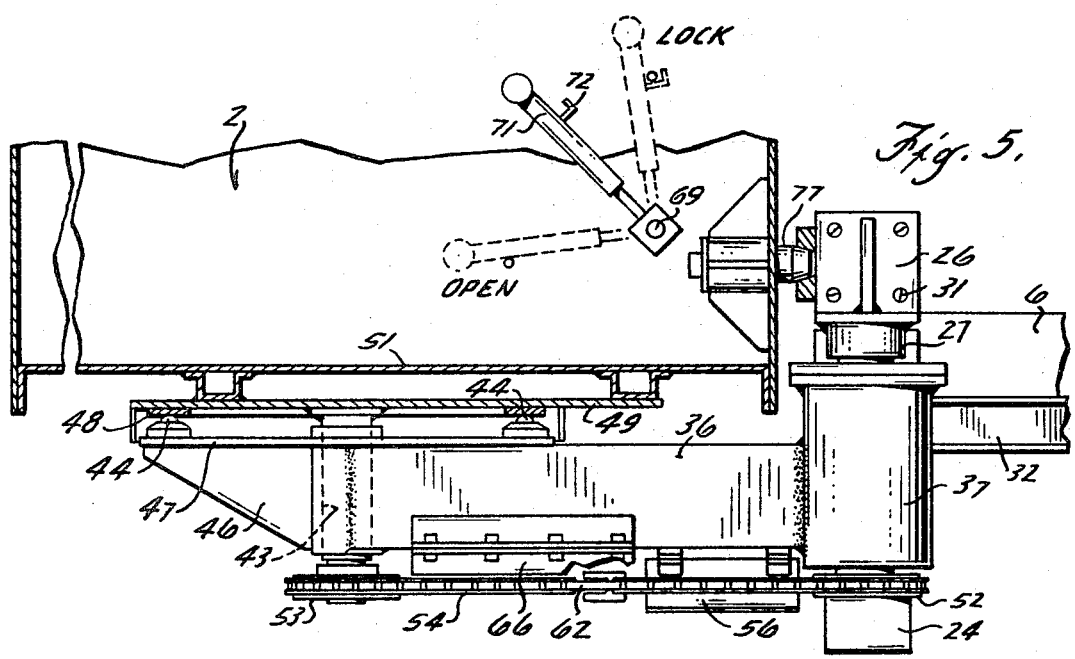
FIG. 5 is an enlarged elevation on line V—V of FIG. 4, portions of the cab in FIG. 5 being broken away and shown in section.

The cab 2 has a generally rectangular floor 51 (FIG. 5) which is suitably mounted on top of the turntable 49 for rotation in unison therewith on the axis of the journal 43. A driver's seat 50 and various controls (not shown) for operating the vehicle are arranged within the cab, and flexible remote control elements such as cables and hose lines (not shown) extend from the cab to appropriate operating components on the vehicle body.

The arm 36 and its pivot connections with the vehicle body and cab represent horizontally articulated, vertically rigid supporting means which mount the cab 2 on the vehicle body for selective adjustment either into a transit position forward of and between the ends of the front edge 19, or into a cargo transfer position outward of and between the ends of the side edge 21.

The pin 24 and associated roller bearings 33, 34 which afford the vertical pivot axis of the support arm 36 on the vehicle body are located at the forward end of the side edge 21. The effective length of the support arm 36, that is, the center distance between the pin 24 and the journal 43 is such as to accommodate horizontal translatory back and forth swinging movement of the cab between its transit and cargo transfer positions.

FIGS. 4 to 8 show a first form of a reversible power transmitting mechanism for effecting arcuate translatory back and forth movement of the cab between its transit and cargo transfer positions. This first form of the mechanism comprises a pair of sprocket wheels 52 and 53 on the stationary pin 24 and on the rotatable cab journal 43, respectively; an endless chain 54 which is trained about the sprocket wheels; and a hydraulic ram 56 which is operatively interposed between the support arm 36 and a portion of the chain 54 intermediate the sprocket wheels 52 and 53. The sprocket wheel 52 is nonrotatably secured to a portion of the stationary pin 24 below the rotatable bearing sleeve 37, and the sprocket wheel 53 is nonrotatably secured to a portion of the rotatable cab journal 43 below the bearing sleeve 39. The chain 54 includes a turnbuckle 57 by means of which its length may be adjusted for proper cooperation with the sprocket wheels 52 and 53.

The hydraulic ram 56 comprises a cylinder 58 which is secured in a fixed position on the hollow beam 38 by clamps 59. The ram is double acting, that is, its piston rod 61 may be forced by fluid pressure back and forth between retracted and extended positions as indicated in FIG. 6. The outer end of the piston rod 61 is connected to a crosshead 62, which is guided by means of rollers 63 for linear back and forth movement between parallel angle irons 64 and 66 depending from the hollow beam 38, as best shown in FIGS. 6 and 8. The cross head 62 is interposed between consecutive links in the stretch of the chain 54 which extends between the sprocket wheels 52, 53 opposite to the turnbuckle 57.

As shown in FIG. 4, the hydraulic ram 56 and associated chain drive 52, 53, 54 are so arranged that the cab 2 will be in its transit position when the hydraulic ram 56 is contracted, and so that the cab will be in its cargo transfer position when the ram 56 is extended. Thrust applied to the chain 54 by expansion of the ram has the double effect of moving the sprocket wheel 53 and arm 36 anticlockwise in an arcuate path about the axis of the stationary pin 24, and of simultaneously causing rotation of the sprocket wheel 53 on its axis in clockwise direction as viewed in FIG. 6. The pitch diameter of the sprocket wheel 52 is the same as that of the sprocket wheel 53. As a result, expansion of the ram 56 from its contracted to its expanded condition will cause translatory movement of the cab 2 from its transit to its cargo transfer position, which means that this cab will continuously face in the direction of the vehicle travel while it is being moved from its transit to its cargo transfer position, Analogously, contraction of the ram from its expanded condition and resulting pull on the chain 54 will cause translatory movement of the cab from its cargo transfer to its transit position with the cab continuously facing the direction of the vehicle travel.

Referring to FIGS. 4 and 9, a mechanism for locking the cab 2 in its transit position comprises latch means in the form of a hook 67 on the cab 2, and complementary latch means in the form of a catch 68 on the vehicle body. The latch hook 67 is secured outside of the cab to a rock shaft 69 which is journaled in the right side wall of the cab. Mounted on the inner end of the rock shaft 69 is a hand lever 71 for swinging the latch hook 67 into and out of engagement with the catch 68. The hand lever 71 has a locking clip 72 (FIG. 5), and a spring 73 (FIG. 9), biases the latch hook into engagement with a stop pin 74 on the cab. When the cab is swung from its cargo transfer position to its transit position the latch hook 67 snaps into locking engagement with the catch 68. Tapered dowel studs 76 and 77 on the cab move into complementary tapered sockets at the forward side of the chassis front cross beam 8, in order to stabilize the cab 2 in its transit position on the vehicle body.

The overall width of the vehicle, with the cab in the transit position, may be as large as highway regulations will permit. When the cab is adjusted to the cargo transfer position, it recedes behind the front edge of the cargo deck, that is, behind a plane extending transversely of the vehicle through the front edge 19 of the cargo deck. The front edge 19 is thereby entirely cleared so that the vehicle can be nosed up to a building or the like, and the front edge of the cargo deck can be closely alined with a loading platform of the building or the like.

A modified form of reversible power transmitting mechanism for effecting arcuate translatory back and forth movement of the cab 2 between its transit and cargo transfer positions is shown in FIGS. 10, 11 and 12. In this modified form, sprocket wheels 52' and 53' are nonrotatably secured, respectively, to a stationary pin 24' on the vehicle body and to a rotatable cab journal 43' on a support arm 36'. An endless chain 54' is trained about the sprockets 52' and 53'. In these respects the modified mechanism corresponds to the mechanism shown in FIGS. 4 to 6 and, like the latter, represents epicyclic turning means for the cab. The sprocket wheels 52', 53', like the sprocket wheels 52, 53, represent stationary and orbital reaction elements which are connected, respectively, with the truck chassis and cab and with each other so as to maintain the cab in facing relation to thedirection of vehicle travel while it is moved back and forth between its transit and cargo transfer positions. However, in the modified form of cab turning mechanism, no hydraulic ram, such as the hydraulic ram 56, is connected to the chain 54' of the modified mechanism.

Power for swinging the support arm 36' about the axis of the stationary upright pin 24' on the vehicle body is derived from a rotary type hydraulic motor 78 which, as shown in FIGS. 10, 11 and 12, is mounted on the cargo deck at a fixed radial spacing from the axis of the pin 24'. A transverse beam 79 of the cargo deck is spaced rearwardly from the front cross beam 8', and a short longitudinal brace 81 is secured at its opposite ends to the beams 8' and 79. An angle clip 82 depends from the brace 81, and the motor 78 is secured to the angle clip 82 in a position presenting its rotary shaft on a vertical axis. The lower end of the upright shaft 24' is welded to a fabricated bracket structure 83 corresponding to the angle bracket 23 of FIG. 3.

The hydraulic motor 78 has a driving sprocket 84 which is connected by a chain 86 with a driven sprocket 87 on the sleeve 37' of the support arm 36'. The motor is reversible, and rotation of its driving sprocket 84 in opposite directions will cause the cab 2 to swing back and forth between the transit and cargo transfer positions in which the cab is shown in full and dotted lines, respectively, in FIG. 11. The chain drive 52', 53' and 54' in FIGS. 10, 11 and 12, like the chain drive 52, 53, 54 in FIGS. 4, 5 and 6 functions to rotate the cab 2 relative to its support beam in the proper direction and at the proper speed, so as to maintain the cab in facing relation to the direction of vehicle travel while it is being moved from its transit to its cargo transfer position, and vice versa, by back and forth swinging movement of the support arm 36. In other words, the modified form of power transmitting mechanism, like the first form of power transmitting mechanism shown in FIGS. 4 to 6, includes turning means for the cab reacting between the latter and the vehicle chassis so as to maintain the cab in facing relation to the direction of vehicle travel while it is moved back and forth between transit and cargo transfer positions.

While in the foregoing two embodiments of the invention have been disclosed, it should be understood that it is not intended to limit the invention to the forms and details of construction herein shown and described, and that the invention includes such other forms and details as are embraced by the scope of the appended claims.

What is claimed and desired to secure by Letters Patent is:

1. A motor vehicle comprising a wheeled chassis, a cargo deck on said chassis having a front edge between longitudinally extending side edges thereof; an operator's cab; horizontally articulated and vertically rigid supporting means mounting said cab on said chassis for selective adjustment either into a transit position forward of and between the ends of said front edge, or into a cargo transfer position outward of and between the ends of one of said side edges; and epicyclic turning means for said cab comprising stationary and orbital reaction elements connected, respectively, with said chassis and cab and with each other so as to maintain said cab in facing relation to the direction of vehicle travel while it is moved back and forth between said transit and cargo transfer positions.

2. A motor vehicle as set forth in claim 1 and further comprising latch means on said cab and complementary latch means on said chassis for releasably securing said cab in said transit position.

3. A motor vehicle as set forth in claim 1 and further comprising reversible power transmitting means operatively associated with said supporting and turning means so that actuation of said supporting and turning means by said power transmitting means in one direction will move said cab from said transit to said cargo transfer position and simultaneously maintain said cab in forward facing relation to the direction of vehicle travel, and so that actuation of said supporting and turning means by said power transmitting means in the opposite direction will move said cab from said cargo transfer to said transit position and simultaneously maintain said cab in said forward facing relation to the direction of vehicle travel.

4. A motor vehicle comprising, a vehicle body having a front edge between longitudinally extending side edges thereof; a driver's cab; a support arm having pivot connections at its opposite ends on vertical axes with said vehicle body and cab, respectively; the effective length of said support arm being such as to accommodate horizontal back and forth swinging movement of said cab between a transit position forward of and between the ends of said front edge, and a cargo transfer position outward of and between the ends of one of said side edges; a pair of sprocket wheels non-rotatably secured to said vehicle body and cab, respectively, on the axes of said pivot connections; and an endless chain trained about said sprocket wheels.

5. A motor vehicle as set forth in claim 4, wherein bearing means affording a vertical pivot axis for said support arm are mounted on said vehicle body at the forward end of said one side edge thereof.

6. A motor vehicle as set forth in claim 4 and further comprising a hydraulic ram having its relatively reciprocable elements connected, respectively, with said support arm and chain.

7. A motor vehicle as set forth in claim 4 and further comprising a hydraulic motor mounted on said vehicle body, and power transmitting means connected in driven relation with said motor and operatively connected with said support arm for rotating the latter about its pivot axis on said vehicle body.

8. A motor vehicle as set forth in claim 7, wherein said power transmitting means comprise a rotatable driving sprocket connected with said motor, a driven sprocket non-rotatably secured to said support arm on the axis of rotation of the latter relative to said vehicle body, and an endless chain trained about said driving and driving sprockets.

References Cited

UNITED STATES PATENTS

| | | | |
|---|---|---|---|
| 2,607,432 | 8/1952 | Lommel | 180—77 |
| 3,233,765 | 2/1966 | Barnes | 180—77 |
| 3,254,900 | 6/1966 | Allen | 180—14 X |

FOREIGN PATENTS

| | | |
|---|---|---|
| 725,871 | 2/1932 | France. |
| 1,022,623 | 3/1966 | Great Britain. |

A. HARRY LEVY, *Primary Examiner.*